(12) United States Patent
Solinsky et al.

(10) Patent No.: US 6,292,106 B1
(45) Date of Patent: Sep. 18, 2001

(54) ACOUSTICAL SYSTEM AND METHOD FOR SIMULTANEOUSLY LOCATING AND TRACKING MULTIPLE PERSONNEL IN ROOMS OF A BUILDING

(75) Inventors: James C. Solinsky, La Jolla; John B. Roes, San Diego, both of CA (US)

(73) Assignee: Cubic Defense Systems, Inc., San Diego, CA (US)

( * ) Notice: Subject to any disclaimer, the term of this patent is extended or adjusted under 35 U.S.C. 154(b) by 0 days.

(21) Appl. No.: 09/170,584

(22) Filed: Oct. 13, 1998

(51) Int. Cl.[7] .................................................. G08B 5/22
(52) U.S. Cl. .............................. 340/825.49; 340/10.2; 340/10.6; 340/573.4; 367/99; 342/353; 342/450
(58) Field of Search ........................ 340/825.49, 10.2, 340/10.6, 573.4; 367/124, 199, 99; 342/353, 450; 701/213, 215

(56) References Cited

U.S. PATENT DOCUMENTS

| | | | |
|---|---|---|---|
| 3,439,320 | * 4/1969 | Ward | 340/825.49 |
| 3,696,384 | * 10/1972 | Lester | 367/199 |
| 3,739,329 | * 6/1973 | Lester | 340/825.49 |
| 4,225,953 | * 9/1980 | Simon et al. | 340/825.49 |
| 4,758,691 | 7/1988 | De Bruyne . | |
| 4,819,053 | * 4/1989 | Halavais | 342/353 |
| 4,954,836 | * 9/1990 | Sakuma | 342/450 |
| 4,990,892 | * 2/1991 | Guest et al. | 340/825.49 |
| 4,991,148 | * 2/1991 | Gilchrist | 367/124 |
| 5,280,457 | 1/1994 | Figueroa et al. | 367/127 |
| 5,426,425 | * 6/1995 | Conrad et al. | 340/825.49 |
| 5,930,202 | * 7/1999 | Duckworth et al. | 367/127 |

OTHER PUBLICATIONS

"Ultrasonic Positioning,"VTT Automation, Oct. 16, 1998.
"Ultrasonic Positioning," ISI, Oct. 16, 1998.
"Ultrasonic Location System," The Oliveti & Oracle Research Laboratory, Oct. 16, 1998.

* cited by examiner

*Primary Examiner*—Brian Zimmerman
*Assistant Examiner*—Yves Dalencourt
(74) *Attorney, Agent, or Firm*—Michael H. Jester

(57) ABSTRACT

A radio frequency (RF) sync pulse is transmitted throughout a building having a plurality of rooms to be traversed by a plurality of players during, for example, an assault training exercise. Ultra-sound pulses are transmitted from fixed piezoelectric transducers mounted at each corner of each room. The ultra-sound pulses with encoded room identity information are generated in a predetermined timed sequence by different ultra-sound transducers after each RF sync pulse. Each player carries an RF receiver for receiving the RF sync pulses. Each player also carries multiple microphones for receiving the ultra-sound pulses transmitted in a room in which the player is currently located. Timing circuitry carried by each player generates signals representative of the delays between each RF sync pulse and the receipt of each of the ultra-sound pulses sequentially received thereafter. Each player carries an RF transmitter for transmitting an RF tracking signal representing an identity of the room an identity of the player and the respective delays that each ultra-sound pulse is received after each RF sync pulse. A control facility receives all of the RF tracking signals from all of the players and determines each player's current position within one of the rooms based upon the room identity code and the delays that each ultra-sound pulse is received after each RF sync pulse for each player. The control facility displays the identity and current location of each player as each player moves within the rooms and moves from room to room. The azimuth and elevation of each player along with the articulation of a weapon held by each player can also be determined and displayed.

20 Claims, 4 Drawing Sheets

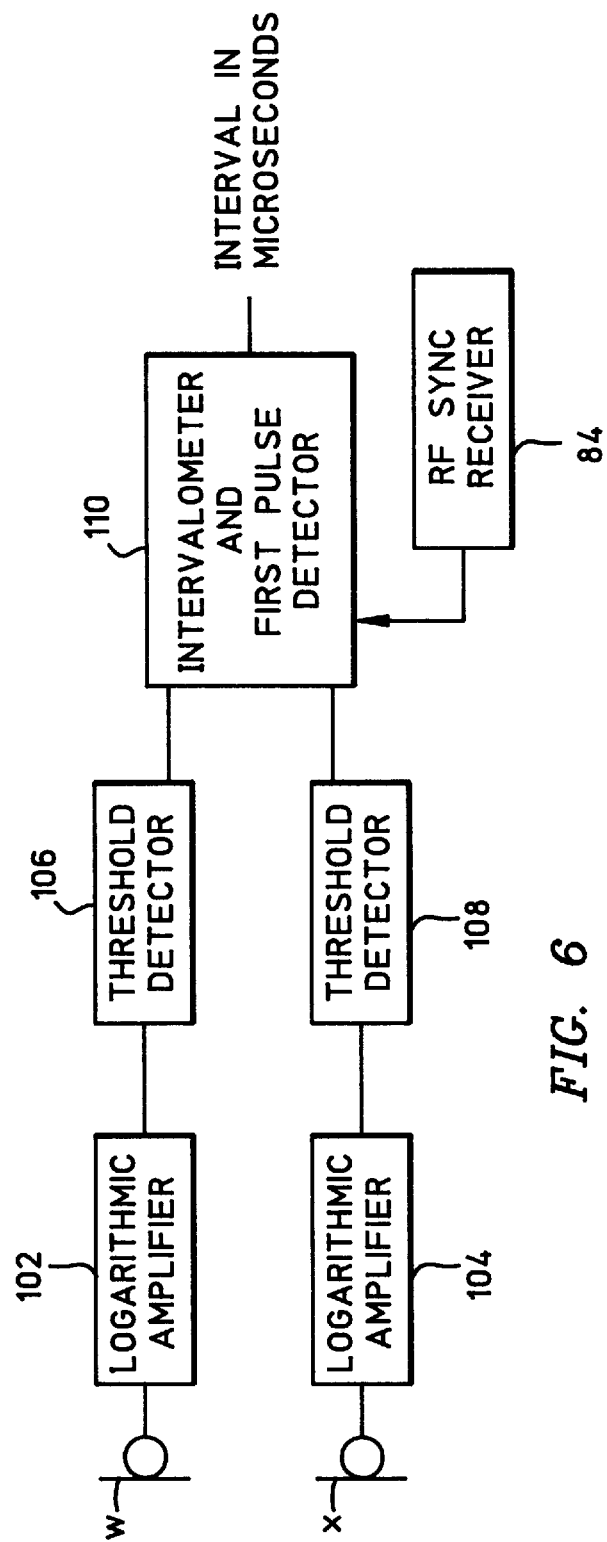
FIG. 6
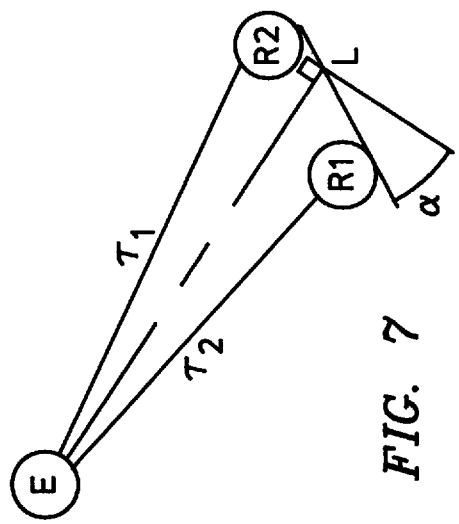
FIG. 7
FIG. 8

ACOUSTICAL SYSTEM AND METHOD FOR SIMULTANEOUSLY LOCATING AND TRACKING MULTIPLE PERSONNEL IN ROOMS OF A BUILDING

BACKGROUND OF THE INVENTION

The present invention relates to electronic systems and methods for accurately locating stationary or moving objects, and more particularly, to a system and method that utilizes high frequency sound waves to precisely locate and track multiple personnel within confined areas such as buildings.

There are many instances where law enforcement personnel or soldiers need to carry out well coordinated operations in urban terrain. For example, team members of special weapons and tactics (SWAT) units need to follow very special coordinated movements when raiding a building where hostages are being held. As another example, team members of military commando units must adhere to strict rules of advancement and engagement when clearing a building suspected of housing snipers. It is therefore necessary for such law enforcement personnel and soldiers to receive rigorous training in environments that simulate real-life expected conditions as closely as possible. It is desirable that the instructors have a highly accurate real time picture of the precise location and movement of each member of the assault team. Optimally the instructors need to know the identity of each soldier and his or her precise movements from room-to-room.

It is difficult to track the movements of military commandos during simulated urban assaults because they often take place in complete darkness thus requiring the use of infrared night vision devices. Therefore, it is not possible simply to use video surveillance. Infrared tracking is not a viable option because the rooms are often smoke filled. Infrared tracking also requires mirrors and other delicate devices not well suited for harsh training environments. Furthermore, infrared tracking could interfere with MILES training equipment often used by the U.S. Army. A radar-based locating system would not be appropriate for simulated urban training environments because of the distortions induced by the building structures such as steel door frames that would impair location accuracy. In any case, radar cannot give very precise distance measurements where the distances being measured are relatively small. A GPS-based locating system would not be practical for simulated urban training environments because location accuracy would be insufficient, even assuming that enough satellite signal strength could be acquired inside of the building without distortion from steel columns and rebar.

In addition to locating and tracking multiple personnel within a building, it would also be desirable in addition to be able to determine both the azimuth and elevation of such personnel to determine, for example, the direction that each soldier is facing and whether each soldier is standing, lying, climbing, descending or perched off the floor. It would further be desirable to provide an indication of the direction that each solder is pointing his or her weapon.

SUMMARY OF THE INVENTION

It is therefore the primary object of the present invention to provide a system for precisely locating and tracking multiple personnel within confined areas such as buildings.

It is another object of the present invention to provide a method for precisely locating and tracking multiple personnel within confined areas such as buildings.

It is another object of the present invention to provide a system and method of the foregoing type that can also determine and display the azimuth and elevation of each personnel.

It is still another object of the present invention to provide a system and method of the foregoing type that can also determine and display the articulation of a weapon held by each personnel.

In accordance with the present invention a system is provided for locating and tracking personnel in rooms of a building during assault training. A radio frequency (RF) sync pulse is transmitted throughout a building having a plurality of rooms to be traversed by a plurality of players. Ultra-sound pulses are transmitted from a plurality of locations in each room. The ultra-sound pulses are generated in a predetermined timed sequence after each RF sync pulse. Each player carries an RF receiver for receiving the RF sync pulses. Each player also carries at least one microphone for receiving the ultra-sound pulses transmitted in a room in which the player is currently located. Circuitry carried by each player generates signals representative of the delays between each RF sync pulse and the receipt of each of the ultra-sound pulses sequentially received thereafter. Each player carries an RF transmitter for transmitting an RF tracking signal representing an identity of the player and the respective delays between each RF sync pulse and the time each ultra-sound pulse is thereafter received. A control facility receives all of the RF tracking signals from the players and determines each player's current position within one of the rooms based upon the delays. The control facility displays the identity and current location of each player as each player moves within the rooms and moves from room to room.

In accordance with the present invention a method is also provided for locating and tracking personnel in rooms of a building. The first step of the method involves transmitting a radio frequency (RF) sync pulse throughout a building having a plurality of rooms to be traversed by a plurality of players. The second step of the method involves transmitting ultra-sound pulses from a plurality of fixed locations in each room. The ultra-sound pulses are generated in a predetermined timed sequence after each RF sync pulse. The third step of the method involves receiving at each player the RF sync pulses and generating signals representative of the time each RF pulse is received by each player. The fourth step of the method involves receiving at each player the ultra-sound pulses transmitted in a room in which the player is currently located and generating signals representative of the delays between each RF sync pulse and the receipt of each of the ultra-sound pulses sequentially received thereafter by each player. The fifth step of the method involves transmitting from each player an RF tracking signal representing an identity of the player and the delays. The sixth step of the method involves receiving the RF tracking signals from all the players and determining each player's current position within one of the rooms based upon the delays. The final and seventh step of the method involves displaying the identity and current location of each player as the player moves within the rooms.

BRIEF DESCRIPTION OF THE DRAWINGS

FIG. 6 is a functional block diagram of a circuit used to detect the duration or interval between the radio frequency and acoustic pulses in accordance with our invention.

FIG. 7 illustrates a method of detecting the azimuth of a remote object with ultrasonic pulses.

FIG. 8 illustrates the connection of temperature and humidity sensors to the control facility of the system of FIG. 3.

DESCRIPTION OF THE PREFERRED EMBODIMENTS

Figure 1:
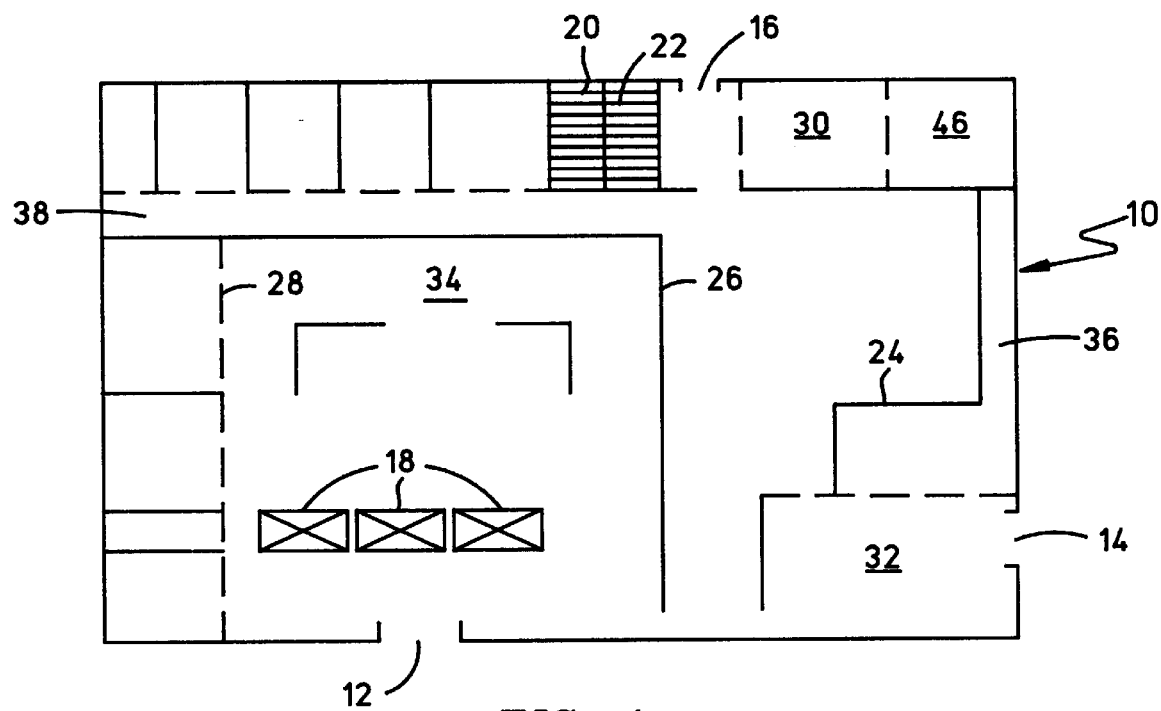
FIG. 1 illustrates a floor plan of a building in which SWAT team or military commando assault training may be conducted.
Figure 2:
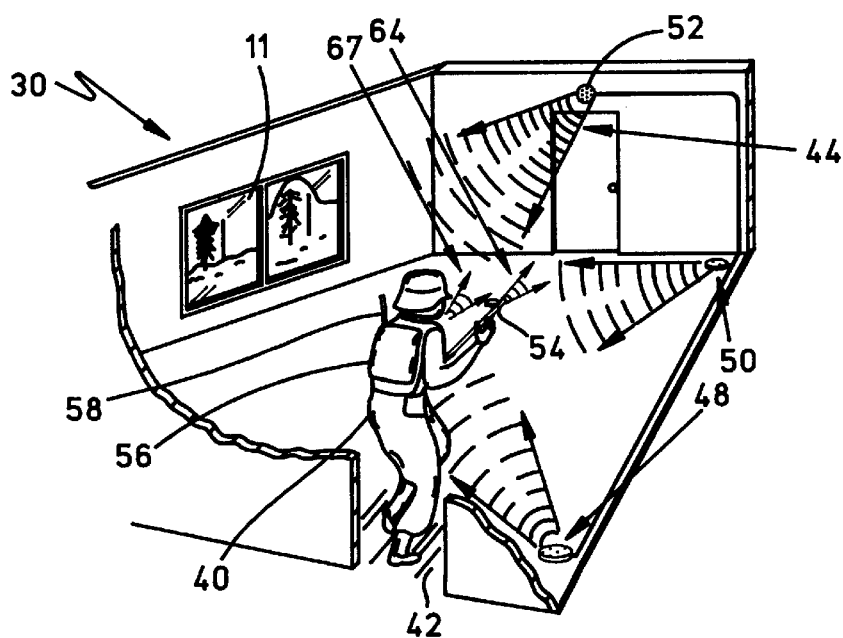
FIG. 2 is a perspective illustration of a soldier entering a room of the building of FIG. 1 which is equipped with components forming a part of a preferred embodiment of the system of the present invention.

FIG. 1 illustrates a floor plan of a building 10 in which SWAT team or military commando assault training may be conducted. For sake of simplicity, SWAT team members and soldiers participating in such training exercises are referred to herein as "players." The building 10 has a generally rectangular footprint with external glass windows such as 11 (FIG. 2). The floor illustrated in FIG. 1 is the ground floor of the building 10 and therefore it has front and side entrance doorways 12 and 14 and a rear exit doorway 16. It also has internal elevators 18 and up-down stair cases 20 and 22. Internal walls such as 24, 26 and 28 subdivide the interior of the floor into a number of rooms such as 30, 32 and 34 and hallways 36 and 38. The building 10 is typically made of a skeletal support structure of steel beams or steel reinforced concrete. The floor plan illustrated in FIG. 1 is merely exemplary. The system of the present invention could be used in any building configuration, even one having a single room.

Instructors need to closely monitor and scrutinize the progress of many players as they enter the building 10 and progress from room to room seeking, for example, to locate and terminate hostile snipers. The instructors preferably need to monitor the direction that each player is facing, whether they are standing, lying or perched on top of furniture, and which direction they are pointing their weapons. It would also be valuable to know whether they are ascending or descending the stair cases 20 and 22 or whether they are perched on top of desks and other furniture not illustrated in FIG. 1.

FIG. 2 is a perspective illustration of a player 40 entering the room 30 of the building 10 of FIG. 1 which is equipped with components forming a part of a preferred embodiment of the system of the present invention as explained hereafter in detail. The player 40 has just entered the room 30 on foot through an open doorway 42 and is progressing toward a closed door 44 at the opposite end of the room 30 that leads to an adjacent room 46 (FIG. 1).

The room 30 (FIG. 2) is equipped with a plurality of fixed-location ultra-sound transducers 48, 50 and 52. The transducers 48 and 50 are mounted on the floor of the building 10 in opposite corners of a common wall. The transducer 52 is located on an adjacent wall above the door 44. The player 40 wears at least two microphones (not illustrated) for detecting ultra-sound pulses from the transducers 48, 50 and 52. The player 40 also carries a weapon in the form of a rifle 54 which he is pointing at the door 44. The rifle 54 is preferably also equipped with a pair of microphones (not illustrated). The player 40 also wears a player data collection unit (PUD) 56 on his or her back which receives signals from the microphones and transmits a radio frequency tracking signal via antenna 58 to a control facility 60 (FIG. 3) preferably located remote from the building 10. These signals are used to precisely locate the player 40 in the room 30 and to track his progress through the room. These signals may also be used to determine the articulation (pointing direction) of the player's weapon 54. The receipt of ultra-sonic acoustic pulses from the transducer 52 by the microphones on the player and on his weapon is illustrated diagrammatically at 62 and 64.

Figure 3:
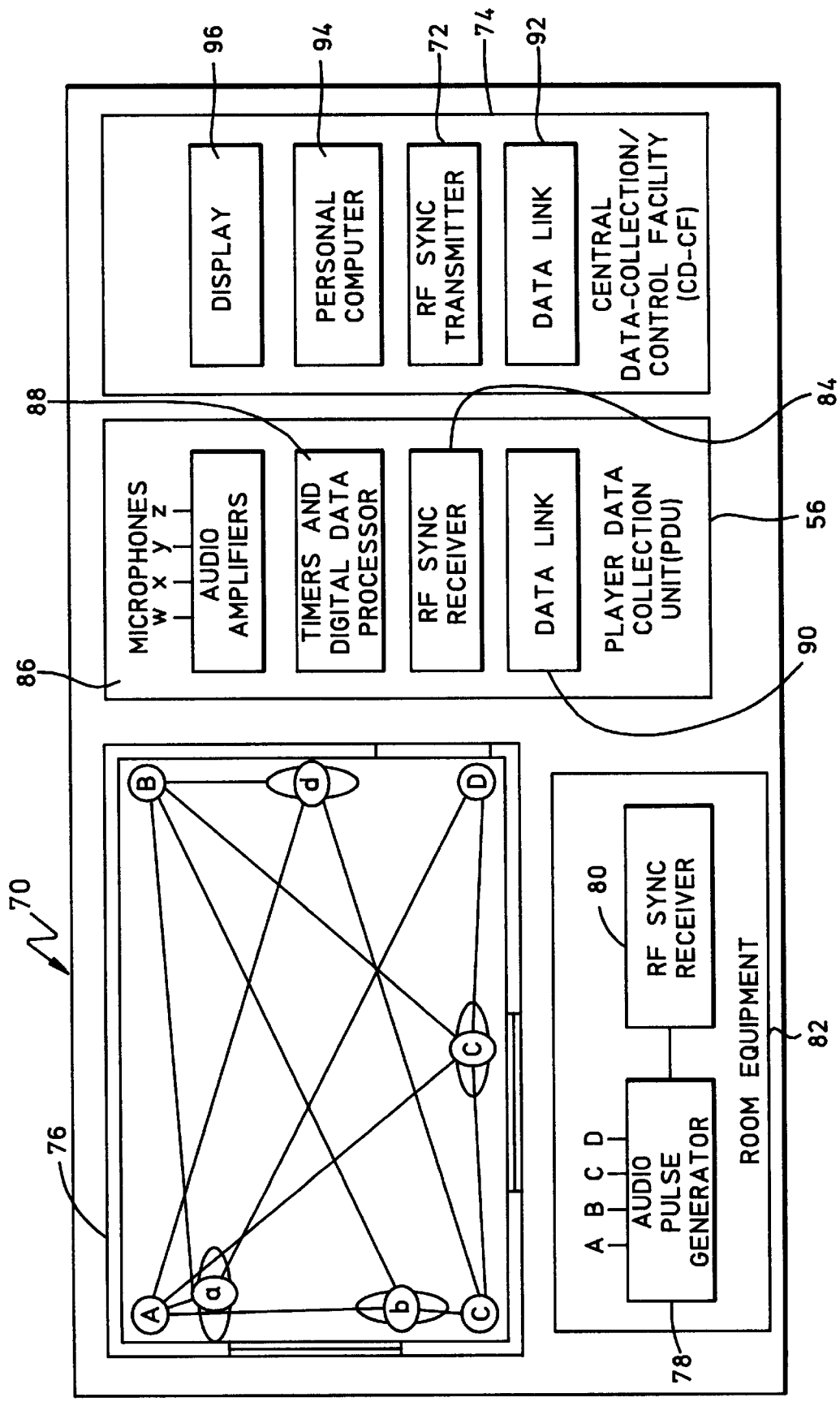
FIG. 3 is a functional block diagram of the preferred embodiment of the system of the present invention.

FIG. 3 is a functional block diagram of the preferred embodiment of a system 70 that may be used to simultaneously locate and track a large number of players in the building 10 in accordance with the present invention. A radio frequency (RF) sync pulse is transmitted throughout the building 10 by a transmitter 72 that forms a part of a central control facility 74. The RF sync pulse is preferably transmitted throughout a simulated village containing many buildings. The RF transmitter 72 can have a very low transmitting power, e.g. one watt, and preferably operates at a frequency of between about nine hundred megahertz and twenty-five hundred megahertz in order to comply with regulations of the United States Federal Communications Commission (FCC).

Referring still to FIG. 3, ultra-sound pulses are transmitted from a plurality of piezoelectric transducers A, B, C and D located in corresponding corners of a room 76. An audio pulse generator 78 supplies high frequency audio signal pulses to the transducers A, B, C and D. By way of example, these ultra-sound audio pulses may be approximately forty kilohertz at approximately 100 dB lasting approximately twelve cycles. The ultra-sound pulses are generated in a predetermined timed sequence after each RF sync pulse. Accordingly, the audio pulse generator 78 is linked to an RF sync receiver 80. The ultra-sound pulses are modulated with a code that uniquely identifies the room 76 within the building 10. The audio pulse generator 78 and RF sync receiver 80 are supported by a power supply and other needed circuitry and collectively these components form part of a self-contained unit referred to as room equipment 82 in FIG. 3. The room equipment 82 is inconspicuously located in the building 10 in a closet or some other concealed location.

Each player wears a player data collection unit 56 (FIG. 3) including an RF receiver 84 for receiving the RF sync pulses. The player data collection unit further includes microphones W, X, Y and Z. Two of these microphones are affixed to the player's opposite shoulders and the other two microphones are affixed to the weapon 54. The microphones W, X, Y and Z receive the ultra-sound pulses transmitted in the room 76 in which the player is currently located. The player data collection unit 56 also includes amplifiers 86 which are connected to the microphones W, X, Y and Z. The outputs of the amplifiers 86 are fed to circuitry 88 where they are digitized and processed to generate signals representative of the delays between the receipt of each RF sync pulse and the receipt of each of the ultra-sound pulses sequentially received thereafter from the transducers A, B, C and D. The player data collection unit 56 includes a data link 90 such as an RF transmitter for transmitting a modulated RF tracking signal representing the unique identities of the room 76 and the player 40 and the delays that each ultra-sound pulse is received by the W, X, Y and Z microphones carried by each player and his or her weapon after each RF sync pulse. In a variation of the preferred embodiment, two microphones can be affixed to each shoulder of each player, one on the front of each shoulder and one on the back of each soldier. This permits the player's orientation to be determined even when the player is lying on his or her back or stomach.

The control facility 74 (FIG. 3) receives all of the RF tracking signals from all of the players in the room 76 via a data link 92. The data link 92 is compatible with the data link 90 of each player data collection unit 56. In the preferred embodiment of our system 70 the data link 92 comprises an RF receiver. A personal computer 94 uses stored programs to determine each player's current position within the room 76 based upon the delays that each ultra-sound pulse is received after each RF sync pulse for each player. Of course this calculation requires the personal computer 94 to factor in the transmitted identity of the room 76, and the known locations and spacings of the transducers A, B, C and D. The time that each RF sync pulse is generated and the times that each of the four ultra-sound pulses are thereafter generated are all known. In the preferred embodiment the RF sync pulse is generated once each second while the transducers A, B, C and D are successively energized at one-quarter second intervals thereafter. The personal computer 94 extracts from the RF tracking signals the delay between the energization of each of the ultra-sound transducers A, B, C and D and the time that each ultra-sound pulse is actually received by the respective microphones W, X, Y and Z. The RF sync pulses travel at the speed of light and the transducers are energized precisely at quarter second intervals. However, sound travels at roughly six hundred miles per hour, depending upon the elevation above sea level, the temperature and the relative humidity. Therefore there is a measurable delay between the emission of each ultra-sound pulse and its receipt. The duration of the delay therefore represents the distance between the microphone receiving the given ultra-sound pulse and the transducer emitting the same. The personal computer 94 calculates the distance of each microphone W, X, Y and Z from each transducer A, B, C and D each second, and using simple geometry, determine the player's location in the room. By using techniques described more fully hereafter in conjunction with FIG. 7, the personal computer 94 can also calculate the azimuth and elevation of the player within the room 76 and the articulation of the weapon 54 held by the player. The personal computer 94 can easily locate and track several hundred players simultaneously.

The control facility 74 (FIG. 3) includes a cathode ray tube, active liquid crystal or other conventional display 96 for indicating in real time and in graphic form the identity and current location of each player as each player moves within the room 76 and moves from room to room within the building 10. FIG. 3 illustrates four players a, b, c and d simultaneously having their locations determined and tracked within the room 76 via transducers A, B, C and D.

As illustrated in FIG. 8, the control facility 74 may be connected to a temperature sensor 98 and a humidity sensor 100. The analog input of these devices is digitized and used by the personal computer 94 to compensate for these environmental variations that affect the speed of sound in order to maximize the location determination accuracy. Variations in intermediate air-mass velocity (wind) can also affect the speed of travel of the acoustic pulses. However, inside of buildings where air currents are minimal these effects can be ignored.

The personal computer 94 also uses the data embedded in each player's tracking signal to determine the orientation of the player 40 and his or her weapon 54 which are both then indicated on the display 96. The orientation of the player 40 and the articulation of the weapon 54 are determined by calculating the azimuth and elevation of these objects using the technique described hereafter.

FIG. 6 is a functional block diagram of a portion of the player data collection unit 56. The microphones W and X on the opposite shoulders of the player 40 are connected to corresponding logarithmic amplifiers 102 and 104. The outputs of the logarithmic amplifiers 102 and 104 are fed to threshold detector circuits 106 and 108, respectively. The outputs of the threshold detector circuits 106 and 108 are processed by an intervalometer and first pulse detector circuit 110. The output signal of the circuit 110 represents the intervals between the RF sync pulse and the successive ultra-sound pulses from the transducers A, B, C and D.

In the preferred embodiment our system, room identity information is preferably encoded into the ultra-sound pulses generated by the transducers in each room, such as A, B, C and D. The central control facility 74 uses this room identity information by referencing look up tables that give the precise location of each fixed sensor in the room so that the distances therefrom to the player can be readily computed from the time delays or durations that are also embedded in the RF tracking signals from the player data collection units 56. Low cost resonant ultra-sound transducers typically limit the data transmission rate to a maximum of about six hundred and twenty-five bits per second. By using a high voltage pulse technique with an ultra-sound transducer a data rate of over three thousand bits per second can readily be achieved.

Figure 4:
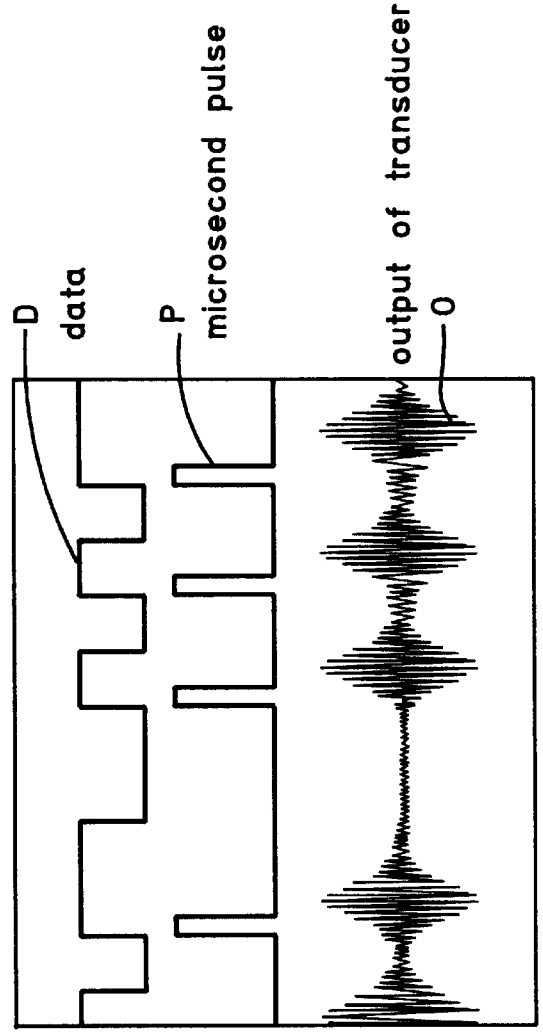
FIG. 4 is an illustration of the waveforms shown on an oscilloscope when a piezoelectric transducer is used to generate a high frequency acoustic pulse in accordance with our invention.
Figure 5:
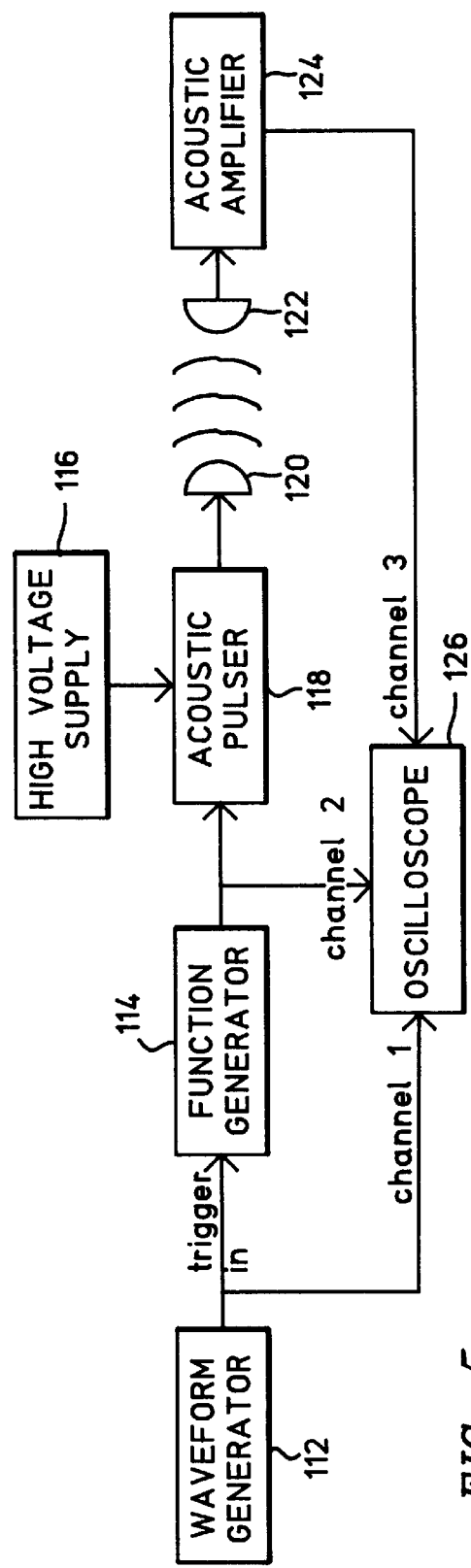
FIG. 5 is functional block diagram of the circuit used to generate the waveforms illustrated in FIG. 4.

FIGS. 4 and 5 illustrate the high voltage pulse technique that is preferably utilized with the ultra-sound transducers in the system 70 of FIG. 3. Normally a resonant circuit or device can be brought to excitation by loosely coupling the device to an energy source that supplies energy at the resonant frequency. The resonant device will build up stored energy until the energy loss mechanisms equal the arriving energy rate. Stress and fatigue limit the maximum energy that can be stored without damaging the resonant device.

An alternate way of supplying energy to a resonant circuit or device is by a sudden application of a single excitation pulse. If the method of supplying energy to the circuit or device does not over-stress the same, then the applied impact magnitude can excite the device to the same level as when the device is excited by a harmonic source. In order to rapidly dampen the resonant device, a second impact is applied out of phase with the resonance set up by the first impact. This permits a relatively high data rate modulation of the resonant device. This technique is preferably applied to the transducers A, B, C and D of the system 70 of FIG. 3.

Referring to FIG. 5, an arbitrary waveform generator 112 has data embedded therein, e.g. in the form of a Manchester code, through a function generator 114. A high voltage source 116 drives an acoustic pulser circuit 118 connected to an ultra-sound transducer 120 in the form of an L type transmitter # 40LR12 commercially available from Polaroid Corporation of Cambridge, Mass. United States of America. The ultra-sound pulse is received by another ultra-sound transducer 122 in the form of a K type receiver # 40KR08 also commercially available from Polaroid Corporation. Both the emitter 120 and the transmitter are resonant at forty kilohertz with a quality factor Q of forty. The active element of each of the transducers 120 and 122 is a ceramic disk of polarized barium titanate. The output of the transducer 122, which functions as an ultra-sound microphone, is fed to an acoustic amplifier 124. The data signal D, high voltage pulse signal P and the receiver transducer output signal O are supplied to an oscilloscope 126 via channels 1, 2 and 3, respectively. FIG. 4 illustrates the waveforms of these three synchronized signals as shown by the oscilloscope 126.

By way of example, an ultra-sound pulse slightly shorter than one-half cycle at forty kilohertz can produce a sound pulse of two cycles. The rising voltage "rings" the transducer and the descending voltage encounters a negative resistance and absorbs most of the "ringing" of the transmitter while shifting the phase of the remaining "ring".

FIG. 7 illustrates a method of detecting the azimuth of a remote object with ultrasonic pulses. Transmit time differences of an acoustic sound pulse as received by two different transducers mounted on a remote object can be measured with a high degree of accuracy, e.g. to within three microseconds. This translates into an angle measurement resolution of three tenths of a degree. Referring now to FIG. 7 an ultra-sound pulse is generated by an emitter E and is received by receivers R1 and R2 mounted a fixed distance L apart from each other on a remote object. The angle $\alpha$ represents the azimuth of the object to be measured. This is the angle between the baseline of the receivers R1 and R2 and the bisectrice of the sound paths plus ninety degrees. $\tau_1$ and $\tau_2$ represent the pulse transmit times from the emitter E to the receivers R1 and R2, respectively. The azimuth $\alpha$ can be calculated as follows where v equals the velocity of sound:

$$\alpha = \sin^{-1} \cdot \frac{V \cdot (\tau_1 - \tau_2)}{L}$$

Elevation can similarly be determined by placing microphones at fixed vertically spaced locations on the remote object and performing a similar calculation. Thus the direction that a player 40 is facing inside a room can readily be determined using the output signals of the two microphones mounted on his or her opposite shoulders. Similarly, the elevation of the player 40 can be determined by processing the output signals of two different microphones affixed at different vertical heights on the player, for example, the helmet and chest. The pointing or articulation of the weapon 54 (FIG. 2) can readily be determined by measuring the time differences in the receipt of a given ultra-sonic pulse by the two different microphones affixed to the same. Where the distance between the player and the ultra-sound emitter E is relatively large compared to the distance between the receivers R1 and R2 the RF receiver is not needed.

While we have described preferred embodiments of our system and method for simultaneously locating and tracking multiple personnel in buildings it should be apparent to those skilled in the art that our invention can be modified in both arrangement and detail. For example, where only a single room is being monitored, the emitters A, B, C and D could be energized at one-quarter second intervals during the first half second after each RF sync pulse. During the second one half second after each RF sync pulse up to four players could transmit his or her room location at one-quarter second intervals with an embedded pulse position code. This simplified approach assumes that a player cannot move very far in one quarter of a second. It also minimizes the amount of signal modulation required with respect to the audio pulses. These and other variations of our system and method can be designed depending upon the particular training requirements. Therefore, the protection afforded our invention should only be limited in accordance with the following claims.

We claim:

1. A system for locating and tracking personnel in rooms of a building, comprising:
    means for transmitting a radio frequency (RF) sync pulse throughout a building having a plurality of rooms to be traversed by a plurality of players;
    means for transmitting ultra-sound pulses from a plurality of fixed locations in each room, the ultra-sound pulses being generated in a predetermined timed sequence after each RF sync pulse;
    means on each player for receiving the RF sync pulses and generating signals representative of the time each RF pulse is received;
    means on each player for receiving the ultra-sound pulses transmitted in a room in which the player is currently located and generating signals representative of the delays between each RF sync pulse and the receipt of each of the ultra-sound pulses sequentially received thereafter;
    means on each player for transmitting an RF tracking signal representing an identity of the player and the delays that each ultra-sound pulse is received after each RF sync pulse; and
    control facility means for receiving the RF tracking signals from the players and for determining each player's current position within one of the rooms based upon the delays that each ultra-sound pulse is received after each RF sync pulse for each player and for displaying the identity and current location of each player as each player moves within the rooms and moves from room to room.

2. The system of claim 1 wherein the ultra-sound pulses transmitted in each room are modulated in a manner indicative of a unique identity of that room, the RF tracking signal also represents the identity of the room in which the player is currently located and the control facility means displays the identity of the room in which the player is currently located.

3. The system of claim 1 wherein the means for transmitting ultra-sound pulses from a plurality of fixed locations in each room includes a piezoelectric ultra-sound transducer mounted in each one of a plurality of corners of the room.

4. The system of claim 1 wherein the means on each player for receiving the ultra-sound pulses includes at least one microphone.

5. The system of claim 1 wherein the control facility means further determines and displays an azimuth of each player.

6. The system of claim 1 wherein the control facility means further determines and displays an elevation of each player.

7. The system of claim 1 wherein the control facility means further determines an articulation of a weapon held by each player.

8. The system of claim 1 wherein the control facility means displays the current location of each player in real time.

9. The system of claim 1 wherein the control facility means includes means for compensating for changes in temperature and/or humidity to minimize degradation in location accuracy.

10. The system of claim 3 wherein the means for transmitting ultra-sound pulses further includes means for generating a pulse of predetermined amplitude and duration sufficient to cause each piezoelectric ultra-sound transducer to resonate.

11. A method for locating and tracking personnel in rooms of a building, comprising:

transmitting a radio frequency (RF) sync pulse throughout a building having a plurality of rooms to be traversed by a plurality of players;

transmitting ultra-sound pulses from a plurality of fixed locations in each room, the ultra-sound pulses being generated in a predetermined timed sequence after each RF sync pulse;

receiving at each player the RF sync pulses and generating signals representative of the time each RF pulse is received by each player;

receiving at each player the ultra-sound pulses transmitted in a room in which the player is currently located and generating signals representative of the delays between each RF sync pulse and the receipt of each of the ultra-sound pulses sequentially received thereafter by each player;

transmitting from each player an RF tracking signal representing an identity of the player and the delays that each ultra-sound pulse is received after each RF sync pulse by the player;

receiving the RF tracking signals from all the players and determining each player's current position within one of the rooms based upon the delays that each ultra-sound pulse is received after each RF sync pulse for each player; and displaying the identity and current location of each player as the player moves within the rooms.

12. The method of claim 11 wherein the ultra-sound pulses transmitted in each room are modulated in a manner indicative of a unique identity of that room, the RF tracking signal also represents the identity of the room in which the player is currently located.

13. The method of claim 11 wherein the ultra-sound pulses are transmitted from a plurality of fixed locations in each room includes a ceramic ultra-sound transducer mounted in a corresponding corner of the room.

14. The method of claim 11 wherein each player receives the ultra-sound pulses with at least one microphone.

15. The method of claim 11 and further comprising the step of determining and displaying an azimuth and/or an elevation of each player.

16. The method of claim 11 wherein the ultra-sound pulses are generated by energizing a transducer with a high voltage pulse of very short duration to thereby cause the transducer to resonate at a predetermined desired frequency.

17. The method of claim 11 and further comprising the step of determining and displaying an articulation of a weapon held by each player.

18. The method of claim 11 and further comprising the step of compensating for changes in temperature and/or humidity to minimize degradation in location accuracy.

19. The method of claim 16 wherein the transducer is a piezoelectric transducer.

20. A method for locating and tracking multiple personnel in a room of a building, comprising:

transmitting a radio frequency (RF) sync pulse at a first predetermined interval in a room to be traversed by a plurality of players;

transmitting ultra-sound pulses from a plurality of fixed locations in the room, the ultra-sound pulses being generated at second predetermined intervals after each RF sync pulse;

receiving at each player the RF sync pulses and generating a signal representative of the time each RF pulse is received by each player;

receiving at each player the ultra-sound pulses transmitted in the room and generating signals representative of the delays between each RF sync pulse and the receipt of each of the ultra-sound pulses sequentially received thereafter by each player;

transmitting from each player an RF tracking signal representing an identity of the player and the delays that each ultra-sound pulse is received after each RF sync pulse by the player;

receiving the RF tracking signals from all the players and determining each player's current position within the room based upon the delays that each ultra-sound pulse is received after each RF sync pulse for each player; and indicating the identity and current location of each player in the room.

* * * * *